US012594613B2

(12) United States Patent (10) Patent No.: US 12,594,613 B2
Shen (45) Date of Patent: Apr. 7, 2026

(54) CUTTING PLIER AND CUTTING PLIER HEAD

(71) Applicants:ZHUJI ITOP HARDWARE TOOLS CO., LTD., Shaoxing (CN); ZHEJIANG IWISS ELECTRIC CO., LTD., Leqing (CN)

(72) Inventor: Yuejuan Shen, Zhuji (CN)

(73) Assignees: ZHEJIANG IWISS ELECTRIC CO., LTD., Yueqing (CN); ZHUJI ITOP HARDWARE TOOLS CO., LTD., Shaoxing (CN)

( * ) Notice: Subject to any disclaimer, the term of this patent is extended or adjusted under 35 U.S.C. 154(b) by 477 days.

(21) Appl. No.: 17/664,586

(22) Filed: May 23, 2022

(65) Prior Publication Data

US 2022/0314346 A1 Oct. 6, 2022

Related U.S. Application Data

(63) Continuation-in-part of application No. PCT/CN2022/084291, filed on Mar. 31, 2022.

(30) Foreign Application Priority Data

Mar. 31, 2021 (CN) .......................... 202120659232.3

(51) Int. Cl.
*B23D 29/02* (2006.01)
*B25B 7/02* (2006.01)
(52) U.S. Cl.
CPC ............... *B23D 29/02* (2013.01); *B25B 7/02* (2013.01)

(58) Field of Classification Search
CPC .................... B23D 29/00; B23D 29/02; B23D 29/023–026; B25B 7/00; B25B 7/02–04; B25B 7/22
See application file for complete search history.

(56) References Cited

U.S. PATENT DOCUMENTS

| 555,108 | A | * | 2/1896 | Morrill | ................. | B26B 17/003 |
| | | | | | | 30/183 |
| 1,373,555 | A | * | 4/1921 | Graham | .................... | B25B 7/02 |
| | | | | | | 30/349 |
| 1,615,882 | A | * | 2/1927 | Luedtke | ................. | B26B 13/04 |
| | | | | | | 30/349 |
| 1,619,181 | A | * | 3/1927 | Beretz | ...................... | B25F 1/04 |
| | | | | | | 30/91.2 |
| 3,220,241 | A | * | 11/1965 | Miller | ................. | H01R 43/015 |
| | | | | | | 81/383 |

(Continued)

*Primary Examiner* — Boyer D Ashley
*Assistant Examiner* — Richard D Crosby, Jr.
(74) *Attorney, Agent, or Firm* — Schwegman Lundberg & Woessner, P.A.

(57) ABSTRACT

A cutting plier and a cutting plier head are provided in this disclosure. The cutting plier includes a cutting plier body, a first cutting part, a second cutting part, an adjusting member and a hinge member. The cutting plier body includes a left handle and a right handle which are hinged with each other. The second cutting part has a shortest gap from the first cutting part and cooperates with the first cutting part to realize a cutting function. The adjusting member is configured for adjusting an amplitude of the shortest gap. One end of the first cutting part is connected with the right handle through a hinge member, and one end of the second cutting part is connected with the left handle through a hinge member.

16 Claims, 13 Drawing Sheets

(56) References Cited

U.S. PATENT DOCUMENTS

| 3,778,919 | A | * | 12/1973 | Simon | A01K 97/18 |
| | | | | | 43/53.5 |
| 4,091,483 | A | * | 5/1978 | Lewis | B25B 7/02 |
| | | | | | 7/132 |
| 4,559,853 | A | * | 12/1985 | Oye | B25B 7/02 |
| | | | | | 294/902 |
| 4,796,318 | A | * | 1/1989 | Bigej | B25B 7/02 |
| | | | | | 7/106 |
| 5,185,930 | A | * | 2/1993 | Hamlin | B25B 7/22 |
| | | | | | 30/131 |
| 5,850,768 | A | * | 12/1998 | Chow | B25B 7/12 |
| | | | | | 81/413 |
| 5,964,131 | A | * | 10/1999 | Seber | B25F 1/003 |
| | | | | | 7/128 |
| 6,279,431 | B1 | * | 8/2001 | Seber | B25B 7/123 |
| | | | | | 81/355 |
| 6,305,086 | B1 | * | 10/2001 | Burgholzer | B26B 17/006 |
| | | | | | 30/186 |
| 6,418,626 | B1 | * | 7/2002 | Jang | B26B 13/16 |
| | | | | | 30/341 |
| 6,694,558 | B2 | * | 2/2004 | Ping | B25F 1/04 |
| | | | | | 7/128 |
| 6,725,546 | B1 | * | 4/2004 | Dallas | B23D 29/002 |
| | | | | | 7/130 |
| D508,640 | S | * | 8/2005 | Ping | D8/55 |
| 6,966,244 | B2 | * | 11/2005 | Herbst | B25B 7/02 |
| | | | | | 81/421 |

| 8,516,931 | B2 | * | 8/2013 | Steele | B25B 7/04 |
| | | | | | 81/414 |
| 8,549,757 | B2 | * | 10/2013 | Wu | B26B 13/16 |
| | | | | | 30/244 |
| 9,108,313 | B2 | * | 8/2015 | Gonzalez | F42B 3/26 |
| 9,687,965 | B2 | * | 6/2017 | DeBaker | B25B 7/00 |
| 10,992,119 | B1 | * | 4/2021 | Cox | H02G 1/1214 |
| 11,383,370 | B2 | * | 7/2022 | Wiwatowski | B26B 1/04 |
| 11,627,735 | B2 | * | 4/2023 | Simos | B25B 7/22 |
| | | | | | 43/53.5 |
| 12,207,636 | B2 | * | 1/2025 | Hardinge | A01K 95/02 |
| 2002/0139227 | A1 | * | 10/2002 | Azkona | B25B 7/10 |
| | | | | | 81/413 |
| 2006/0150418 | A1 | * | 7/2006 | Hsieh | B25B 7/02 |
| | | | | | 30/28 |
| 2007/0221016 | A1 | * | 9/2007 | Herbst | B25G 1/00 |
| | | | | | 81/415 |
| 2011/0030145 | A1 | * | 2/2011 | Mandic | B25G 1/125 |
| | | | | | 81/421 |
| 2014/0338133 | A1 | * | 11/2014 | Gonzalez | F42B 3/26 |
| | | | | | 7/128 |
| 2016/0294168 | A1 | * | 10/2016 | Hoppe | B25B 7/14 |
| 2016/0318158 | A1 | * | 11/2016 | Berglund | B25B 7/123 |
| 2017/0182583 | A1 | * | 6/2017 | Mizutani | B23K 9/328 |
| 2019/0105757 | A1 | * | 4/2019 | Jackson | H02G 1/1212 |
| 2019/0210142 | A1 | * | 7/2019 | Catoe | B08B 9/0436 |
| 2019/0210206 | A1 | * | 7/2019 | Nix | B25F 1/04 |
| 2020/0260711 | A1 | * | 8/2020 | Simos | B25B 7/02 |

* cited by examiner

310

312

311

1

CUTTING PLIER AND CUTTING PLIER HEAD

CROSS-REFERENCE TO RELATED APPLICATIONS

This application is a continuation-in-part of International Application No. PCT/CN2022/084291 filed 31 Mar. 2022, which claims the benefit of priority to Chinese Application No. 202120659232.3, filed 31 Mar. 2021, the benefit of priority of each of which is claimed herein and which applications are hereby incorporated by reference herein in their entirety.

TECHNICAL FIELD

The disclosure relates to a technical field of tools, in particular to a cutting plier and a cutting plier head.

BACKGROUND ART

Pipe fittings are used to connect pipes. General pipe fittings include elbows, tees, reducer, caps, various pipe joints, flanges, valves, expansion joints, pipe supports and so on. For example, non-metallic pipes such as plastic pipes and these pipe fittings are often connected in a socketed manner. During installation, openings of the non-metallic pipes are expanded firstly, then the expanded pipes are sleeved on the pipe fittings, and then the non-metallic pipes shrink and hold the pipe fittings under action of their own tension, so as to achieve a purpose of tightly sleeving the non-metallic pipes on the pipe fittings.

However, in practical applications, there are often situations that need to disassemble the pipe fittings from the pipes, such as installation errors or pipeline reconstruction. If the pipes and the pipe fittings are not closely matched and there are no special structures such as barbs on the pipe fittings, a shearing tool can be used to cut the non-metallic pipes, so that the pipe fittings can be disassembled from the pipes. However, existing shearing tools for disassembling the fittings can only be applied to a single-sized pipe diameter, and when pipelines and fittings with different sizes are required to be disassembled, disassembling tools with different sizes are needed, which causes inconvenience to users and reduces working efficiency.

SUMMARY

In order to overcome at least one shortcomings of the prior art, a cutting plier and a cutting plier head which can be suitable for different sizes of pipe diameters are provided in the present disclosure.

In order to achieve above objects, a cutting plier is provided in the present disclosure, which includes a cutting plier body, a first cutting part, a second cutting part, an adjusting member and a hinge member. The cutting plier body includes a left handle and a right handle which are hinged with each other. The second cutting part has a shortest gap from the first cutting part and cooperates with the first cutting part to realize a cutting function. The adjusting member is configured for adjusting an amplitude of the shortest gap. One end of the first cutting part is connected with the right handle through a hinge member, and one end of the second cutting part is connected with the left handle through a hinge member.

Unlike cutting pliers in the prior art in which a shortest gap between corresponding cutting parts is zero, in the cutting plier provided in the disclosure, the second cutting part has the shortest gap (not zero) from the first cutting part and cooperates with the first cutting part to realize the cutting function, so as to ensure that cut members such as pipes fittings are not damaged by cutting. Furthermore, in the disclosure, the amplitude of the shortest gap can be adjusted through the adjusting member, so as to adapt to the cut members such as pipe fittings of different sizes.

Optionally, the adjusting member includes a fixing structure to be fixed on the left handle, and the adjusting member includes one or more matching structures. Any of the one or more matching structures can be pressed against the right handle by adjusting of the adjusting member, and different matching structures have different distances from the fixing structures. Alternatively, the adjusting member includes a fixing structure to be fixed on the right handle, and the adjusting member includes one or more matching structures. Any of the one or more matching structures can be pressed against the left handle by adjusting of the adjusting member, and different matching structures have different distances from the fixing structures. In this embodiment, that way of adjust the adjusting member can be adjusted in a rotating, folding, displacing manner or any combination of two or more of them. Optionally, the fixing structure is a fixing shaft, and the matching structure includes a rotating plate with a plurality of matching surfaces. The fixing shaft is inserted through the rotating plate and the rotating plate is rotatably disposed on the fixing shaft, and any two or more matching surfaces are at different distances from a central axis of the fixing shaft. The rotating plate is adjusted in a rotating way to make any of the matching surfaces abut against the right or left handle, and thus the matching surface can cooperate with a side of the left or right handle to fix with a shortest gap, with the fixing shaft being disposed perpendicular or approximately perpendicular to the rotating plate. In another feasible embodiment, the fixing shaft can be disposed in parallel with the rotating plate, and a number of the rotating plate can be plural. The rotating plate can be disposed in an invertible way around the fixing shaft, and the rotating plate can be adjusted by inverting the rotating plate to realize adjustment of the amplitude of the shortest gap.

Optionally, the matching structure is matched with the left handle or the right handle with a fixing structure such as a protrusion-groove structure to further fix the shortest gap.

Optionally, a shape of the rotating plate may not be a rotational symmetric pattern. In some other embodiments, the shape of the rotating plate may not be the rotational symmetric pattern, which refers to a pattern that coincides with its initial pattern after being rotated by a certain radian around a fixed point on a plane. However, the pattern of the rotating plate in the present disclosure can be a variation of the rotationally symmetric pattern, for example, a first rotating unit is rotated by a first radian to obtain a second rotating unit, rotated further by the first radian to obtain a third rotating unit, and by such analogy, rotated by the first radian for n times to obtain a (n+1) th rotating unit, and the (n+1)th rotating unit is adjacent to the first rotating unit. By adjusting distances to a rationally fixed point from the first rotating unit, the second rotating unit, the third rotating unit, . . . , and the (n+1)th rotating unit, distances to any two or more of the rotating units are different. The rotating unit can be a straight line, an arc line, or a combination of the straight line and the arc line. As an example, the rotationally symmetric pattern here can be a non-regular polygon such as a non-regular pentagon, or a petal shape. The rotationally fixed point here refers to the central axis. Any two adjacent rotating units of the first rotating unit, the second rotating unit, the third rotating unit . . . , and the (n+1)th rotating unit may or may not be directly connected. Optionally, in order to make rotation smoother, different rotating units are transitioned with an arc.

All of the rotating units shown here have a same shape and size, but in another feasible embodiment, one or two of shapes and sizes may be different. For example, the shape of the rotating plate can be an equilateral triangle which is not an isosceles triangle, or even any other triangle.

Optionally, the first cutting part and the second cutting part are provided with a blunt part and a blade opposite to each other, and the blunt part and the blade cooperate with each other to realize a cutting function, and the blunt part and the blade are separated by a shortest gap when the distance is shortest. In use, the blunt part can be directly matched with the inside of the pipe fittings, which is not easy to damage the pipe fittings.

Optionally, another end of the first cutting part or the second cutting part relative to the blunt part or the blade is provided with a depression, and a size of the depression is designed according to actual requirements. Provision of the depression is conducive to widening an application range of the cutting plier, and the cutting plier can be used in some narrow application environments.

Optionally, the left handle includes a left handle body and a left connecting member, one end of the left handle body is provided with a left connecting member, and the right handle includes a right handle body and a right connecting member, and one end of the right handle is provided with a right connecting member, and the left connecting member and the right connecting member are connected by a pivot on which a spring is sleeved.

Optionally, the left connecting member includes two oppositely arranged left plier pieces, two ends of which are respectively oppositely arranged right plier pieces, two ends of which are respectively connected by fasteners, and middle ends of the two left plier pieces are connected with middle ends of the two right plier pieces by the pivot.

Optionally, the hinge member includes a left hinge piece and a right hinge piece. One end of the left hinge piece is connected with the first cutting part, the other end of the left hinge piece is connected with one of two ends of the two left connecting members; one end of the right hinge piece is connected with the second cutting part, the other end of the right hinge piece is connected with one of two ends of the two right connecting members. The other one of two ends of the two left connecting members is connected with an end of the right hinge piece, and the other one of two ends of the two right connecting members is connected with an end of the left hinge piece.

Optionally, two left plier pieces and two right plier pieces are alternately arranged at two ends of the pivot.

Optionally, the left handle or the right handle further includes a paddle. One end of the paddle is fixed to one of the left plier pieces or the right plier pieces through a fastener, and the other end of the paddle is clamped with the right connecting member or the left connecting member.

Optionally, the blade partially extends to a side of the first cutting part or the second cutting part proximate to the blunt part. In other embodiments, the blade may extend completely to a side of the first cutting part or the second cutting part proximate to the blunt part.

Optionally, the side of the first cutting part or the second cutting part proximate to the blunt part is provided with a groove, and the blade is arranged on a side of the groove away from the cutting plier body, or can be arranged on a side proximate to the cutting plier body.

Optionally, the blade can be detachably arranged on a side of the first cutting part or the second cutting part proximate to the blunt part.

A more concise cutting plier without an adjusting member is further provided in this disclosure, which includes a cutting plier body, a first cutting part, a second cutting part and a hinge member. The cutting plier body includes a left handle and a right handle which are hinged with each other. The second cutting part has a gap greater than zero from at least part of the first cutting part and cooperates with the first cutting part to realize the cutting function. One end of the first cutting part is connected with the right handle through a hinge member, and one end of the second cutting part is connected with the left handle through a hinge member. By controlling the left and right handles to adjust a gap between the first cutting part and the second cutting part, the user can completely control a relative distance between the left and right handles to control the gap between the first cutting part and the second cutting part, so as to handle cut articles with different sizes, models and shapes.

Optionally, the first cutting part and the second cutting part are provided with a blunt part and a blade opposite to each other, and the blunt part and the blade cooperate with each other to realize the cutting function. A side of the first cutting part or the second cutting part provided with the blade proximate to the blunt part is provided with a groove, and a gap between the first cutting part and the second cutting part at a position where the groove is provided is not zero. Optionally, the blade extends to the side of the first cutting part or the second cutting part proximate to the blunt part, and the blade is arranged on a side of the groove away from or proximate to the cutting plier body.

Optionally, a width of the blade is less than 3 cm, and may be 1cm, 2 cm, 2.5 cm, 0.5 cm, etc. The width of the blade is much smaller than that of the groove, and a width direction here is consistent with a extension direction of the blade. The width of the blade is smaller than a distance between an end of a plug of the pipe fitting for plugging in the pipe and a sealing ring, that is, the width of the blade should be small enough so that the blade can avoid the sealing ring of the pipe fitting and not damage the sealing ring.

Optionally, the first cutting part or the second cutting part provided with the blade has a flat end face, so as to avoid other structures on the pipe fitting.

Optionally, a thickness of an end of the first cutting part or the second cutting part provided with the blunt part is gradually reduced to form a pointed part with a prying function.

Optionally, the blade can be detachably arranged on a side of the first cutting part or the second cutting part proximate to the blunt part.

A cutting plier head is further provided in this disclosure, which includes a first cutting part and a second cutting part which are hinged with each other. The second cutting part has a gap which is not zero from at least part of the first cutting part and the second cutting part cooperates with the first cutting part to realize the cutting function.

Optionally, the first cutting part and the second cutting part are provided with a blunt part and a blade opposite to each other, and the blunt part and the blade cooperate with each other to realize the cutting function. A side of the first cutting part or the second cutting part provided with the blade proximate to the blunt part is provided with a groove, and a gap between the first cutting part and the second cutting part at a position where the groove is provided is not zero.

Optionally, the blade partially extends to a side of the first cutting part or the second cutting part proximate to the blunt part.

To sum up, in the cutting plier and the cutting plier head provided in the disclosure, the second cutting part has a shortest gap which is not zero from at least part of the first cutting part and cooperates with the first cutting part to realize the cutting function, so as to ensure that cut members such as pipes fittings are not damaged by cutting.

Optionally, in the disclosure, the amplitude of the shortest gap can be adjusted through the adjusting member, so as to adapt to the cut members such as pipe fittings of different sizes.

DETAILED DESCRIPTION

Figure 1:
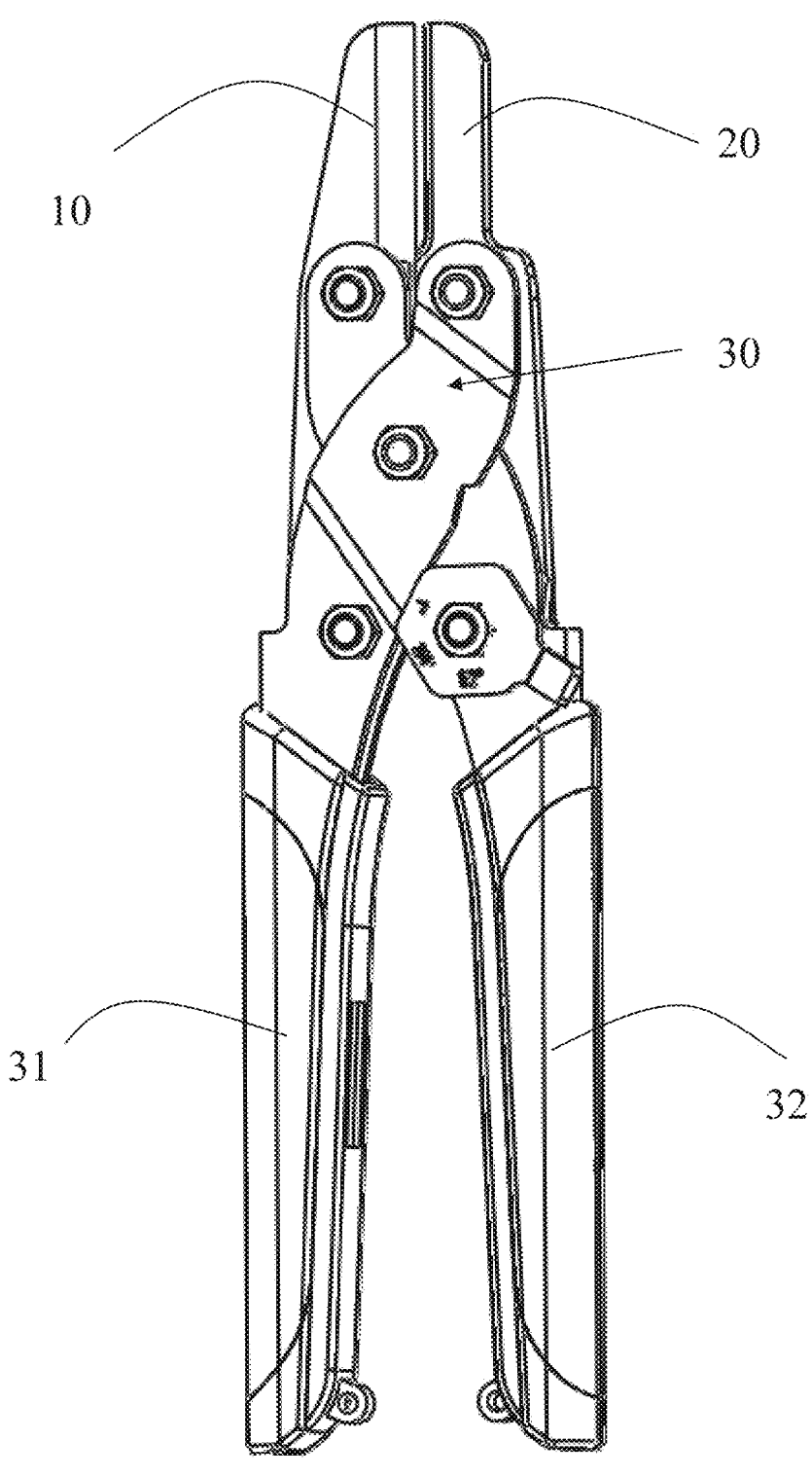
FIG. 1 is a schematic diagram of a side of the cutting plier according to Embodiment 1 of the present disclosure.
Figure 2:
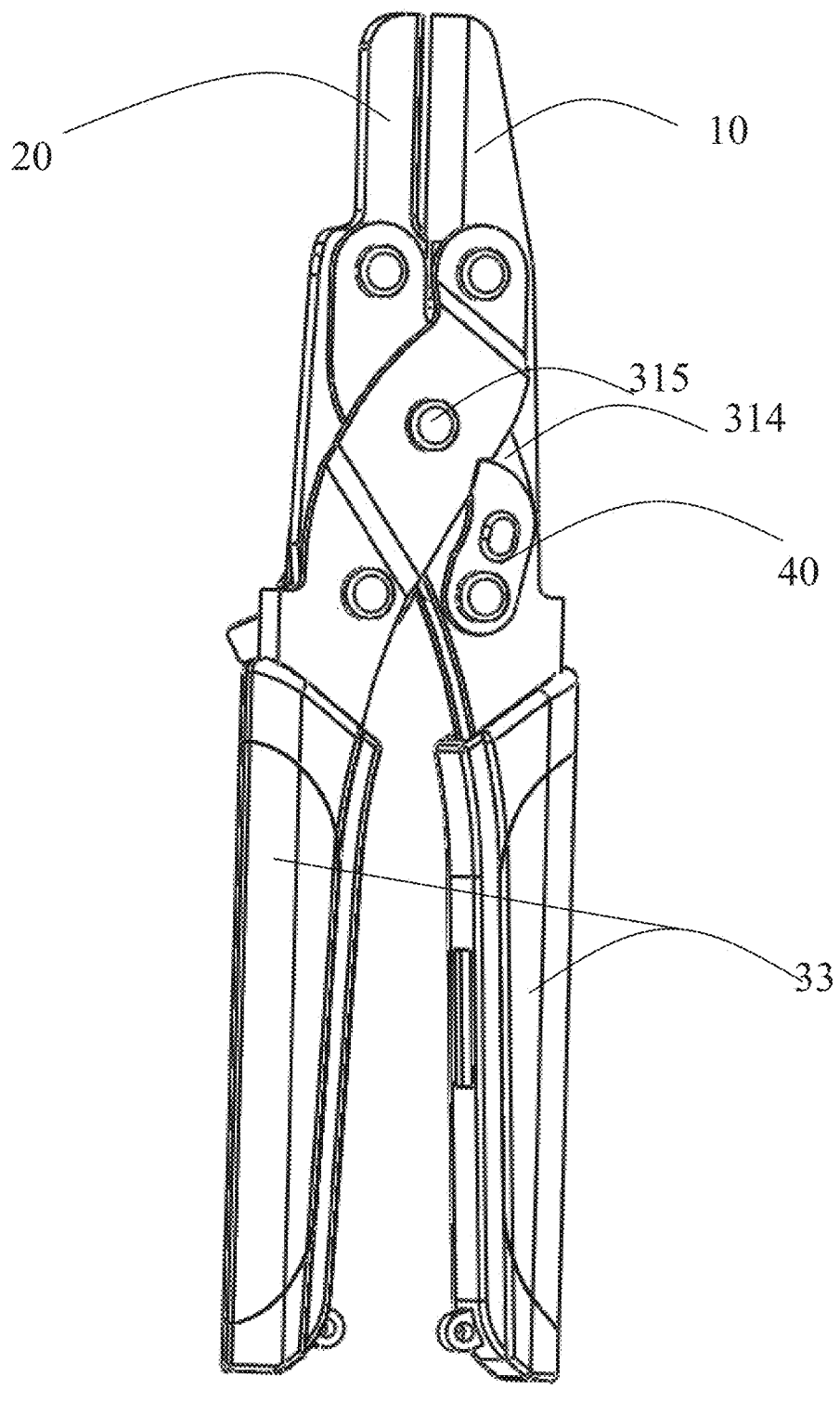
FIG. 2 is a schematic diagram of another side of the cutting plier according to Embodiment 1 of the present disclosure.
Figure 3:
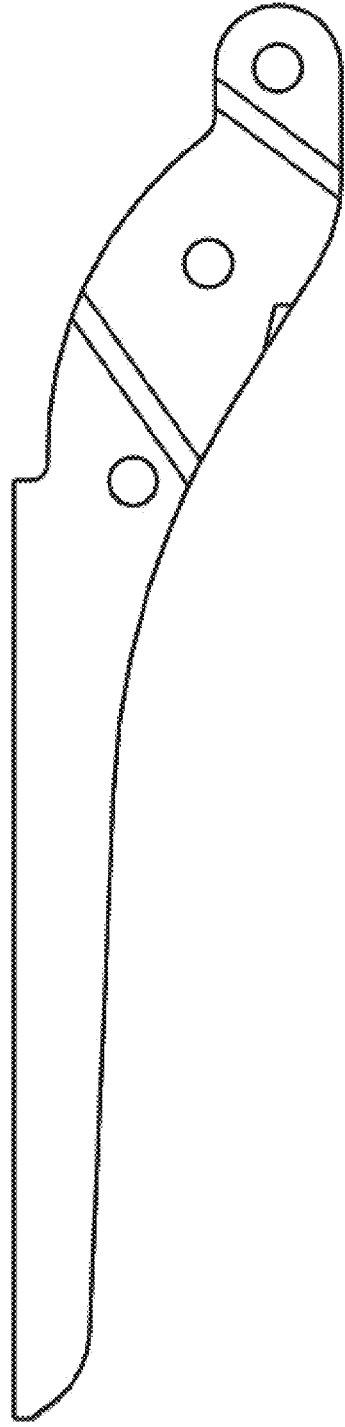
FIG. 3 is a schematic diagram of a side of the left handle according to Embodiment 1 of the present disclosure.
Figure 4:
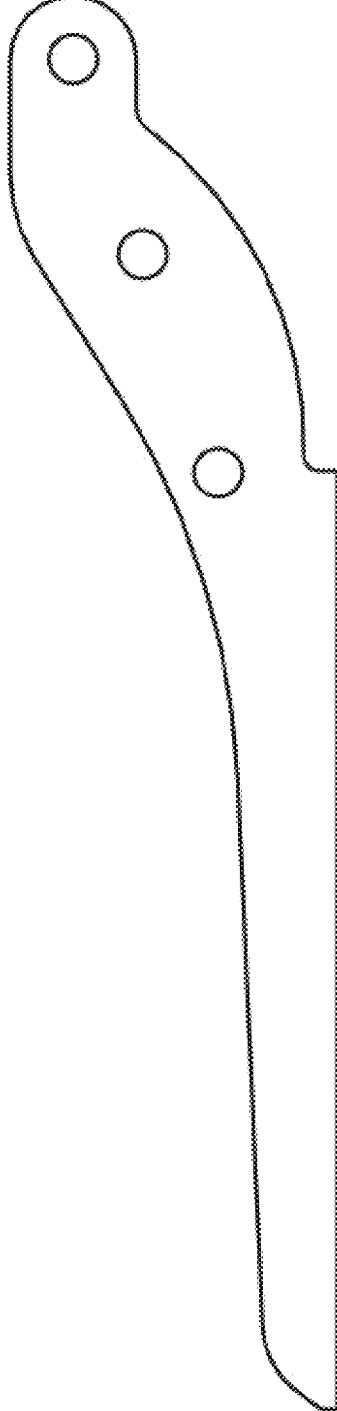
FIG. 4 is a schematic diagram of another side of the left handle according to Embodiment 1 of the present disclosure.

In order to make the above and other objects, features and advantages of the disclosure more obvious and understandable, a detailed description is made below for the preferred embodiments with reference to the accompanying drawings.

In the present disclosure, plural means two and any number more than two.

Embodiment 1

With reference to FIGS. 1 to 8, a cutting plier is provided in this embodiment, which includes a cutting plier body 30, a first cutting part 10, a second cutting part 20, an adjusting member 80 and a hinge member. The cutting plier body includes a left handle 31 and a right handle 32 which are hinged with each other. The second cutting part has a shortest gap from the first cutting part 10 and cooperates with the first cutting part to realize a cutting function. The adjusting member 80 is configured for adjusting an amplitude of the shortest gap. One end of the first cutting part 10 is connected with the right handle 32 through a hinge member, and one end of the second cutting part is connected with the left handle 31 through a hinge member.

Figures 8, 9:
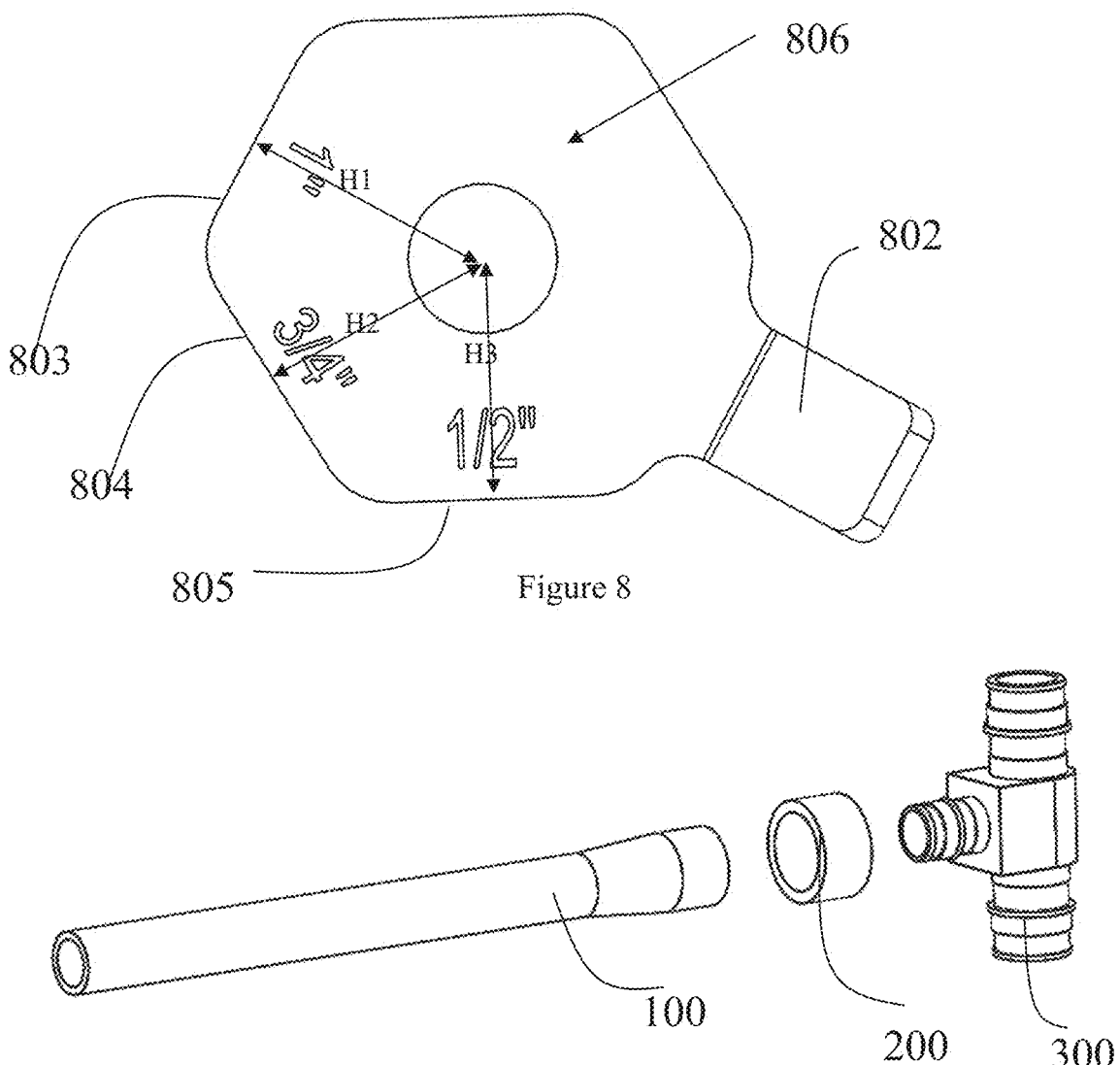
FIG. 8 is a schematic diagram of a rotating plate according to Embodiment 1 of the present disclosure.
FIG. 9 is a schematic diagram of matching of pipes and pipe fittings according to Embodiment 1 of the present disclosure.
Figure 10:
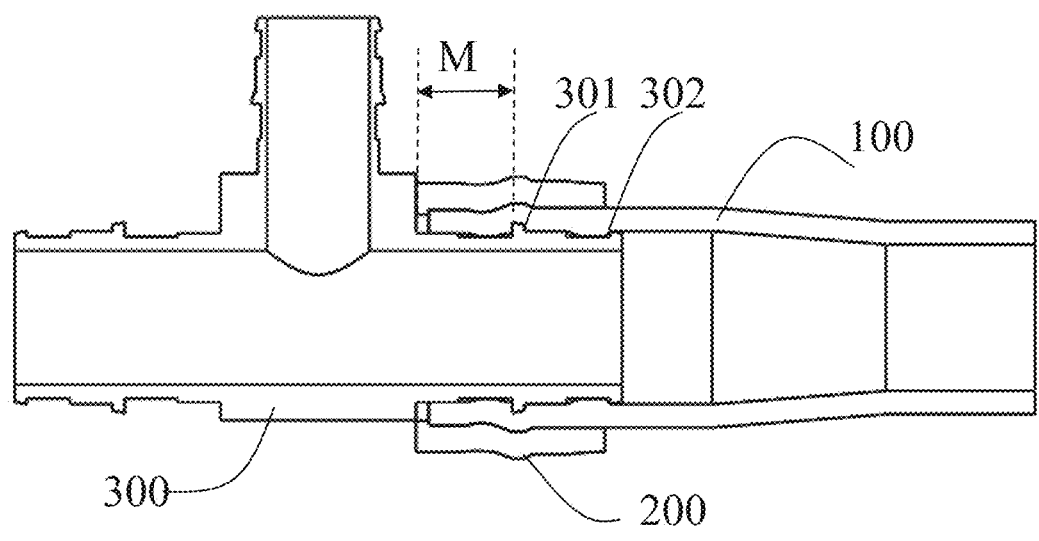
FIG. 10 is another schematic diagram of matching of pipes and pipe fittings according to an embodiment of the present disclosure.

Schematic diagrams of matching of a pipe and a pipe fitting are shown in FIG. 9 and FIG. 10. In installation, a sleeve 200 is sleeved on an end of the nonmetallic pipe 100, then an end of the nonmetallic pipe proximate to an opening is expanded by a tool, and then the expanded pipe is sleeved on the pipe fitting 300. A part of the pipe fitting 300 sleeved on the pipe is provided with a raised sealing ring 301, and then the nonmetallic pipe shrinks and holds the pipe fitting under action of their own tension. During disassembly, the pipe can be cut off first at a position of proximate to the pipe fitting, and then the adjusting member can be adjusted according to a size of the pipe to adjust an amplitude of the shortest gap L, and the pipe can be cut by using the cutting plier in this embodiment. Furthermore, in the cutting plier in the disclosure, the second cutting part has the shortest gap L from the first cutting part and cooperates with the first cutting part to realize the cutting function, so as to ensure that cut members such as pipes fittings are not damaged by cutting.

In this embodiment, the adjusting member includes a fixing structure to achieve a purpose of being fixed on the left handle. The adjusting member includes a matching structure, and the fixing structure is a fixing shaft 801, and the matching structure includes a rotating plate 806 with a plurality of matching surfaces. The fixing shaft is inserted through the rotating plate and the rotating plate is rotatably disposed on the fixing shaft, and any two or more matching surfaces are at different distances from a central axis of the fixing shaft. The rotating plate is adjusted to make any of the matching surfaces abut against a side of the right handle. By adjusting the adjusting member to make any one or more of the matching surfaces abut against the right handle, different matching surfaces have different distances from the fixing structure, and different matching surfaces can be set according to different requirements, such as pipes with different sizes.

In other embodiments, there may be multiple matching structures, and each of the matching structures has one or more matching surfaces.

In this embodiment, as shown in FIG. 8, a shape of the rotating plate is pentagon, and the rotating plate is chamfered. An end of the rotating plate is provided with a tab 802, and other three ends of the rotating plate are provided with three matching surfaces (803, 804, 805), and corresponding marks are provided near the matching surfaces for identification, and distances of the three matching surfaces from the central axis are H1, H2, and H3, respectively; and H1, H2, and H3 are all unequal, for example, they can correspond to 1", ½", and ¾" pipes respectively.

In this embodiment, the first cutting part and the second cutting part are provided with a blunt part 201 and a blade 101 opposite to each other, and the blunt part and the blade cooperate with each other to realize the cutting function. The blade 101 in this embodiment completely extends onto the first cutting part, and thus the second cutting part has a shortest gap L which is not zero from the first cutting part in this embodiment, that is to say, when the cutting plier is used, it is not closed between the second cutting part and the first cutting part in use. When the first cutting part and the second cutting part are nearest to each other, this shortest distance is the shortest gap. When the distance between the blunt part and the blade is the shortest, they are separated by the shortest gap L. In use, the blunt part can be directly matched with the inside of the pipe fittings, which is not easy to damage the pipe fittings. In this embodiment, with adjustment of the adjusting member, the blunt part and the blade are always parallel or approximately parallel, and the shortest gap L in this embodiment is a distance between the blunt part and the blade which are parallel or approximately parallel to each other. In other embodiments, the blunt part and the blade may not be disposed in parallel.

In this embodiment, another side of the first cutting part or the second cutting part relative to the blunt part or the blade is provided with a depression 202, and a size of the depression is designed according to actual requirements. Provision of the depression is conducive to widening an application range of the cutting plier, and the cutting plier can be used in some narrow application environments.

In this embodiment, the left handle includes a left handle body 311 and a left connecting member 310, one end of the left handle body is provided with a left connecting member, and the right handle includes a right handle body and a right connecting member, and one end of the right handle is provided with a right connecting member, and the left connecting member and the right connecting member are connected by a pivot 50 on which a spring is sleeved. The spring functions in restoring. Shapes of a left cutting plier head and a right cutting plier head are the same, but in other embodiments, the shapes of the left cutting plier head and the right cutting plier head may be different.

More specifically, the left connecting member 310 includes two oppositely arranged left plier pieces 312, two ends of which member includes two oppositely arranged right plier pieces 314, two ends of which are respectively connected by fasteners, and middle ends of the two plier pieces are connected with middle ends of the two plier pieces by pivots 315. The fasteners in this embodiment are all bolts. In other embodiments, they can also be studs, nuts, screws, etc. There are four fasteners in this embodiment. The fasteners and the fixing shaft in this embodiment may be the same.

Figure 5:
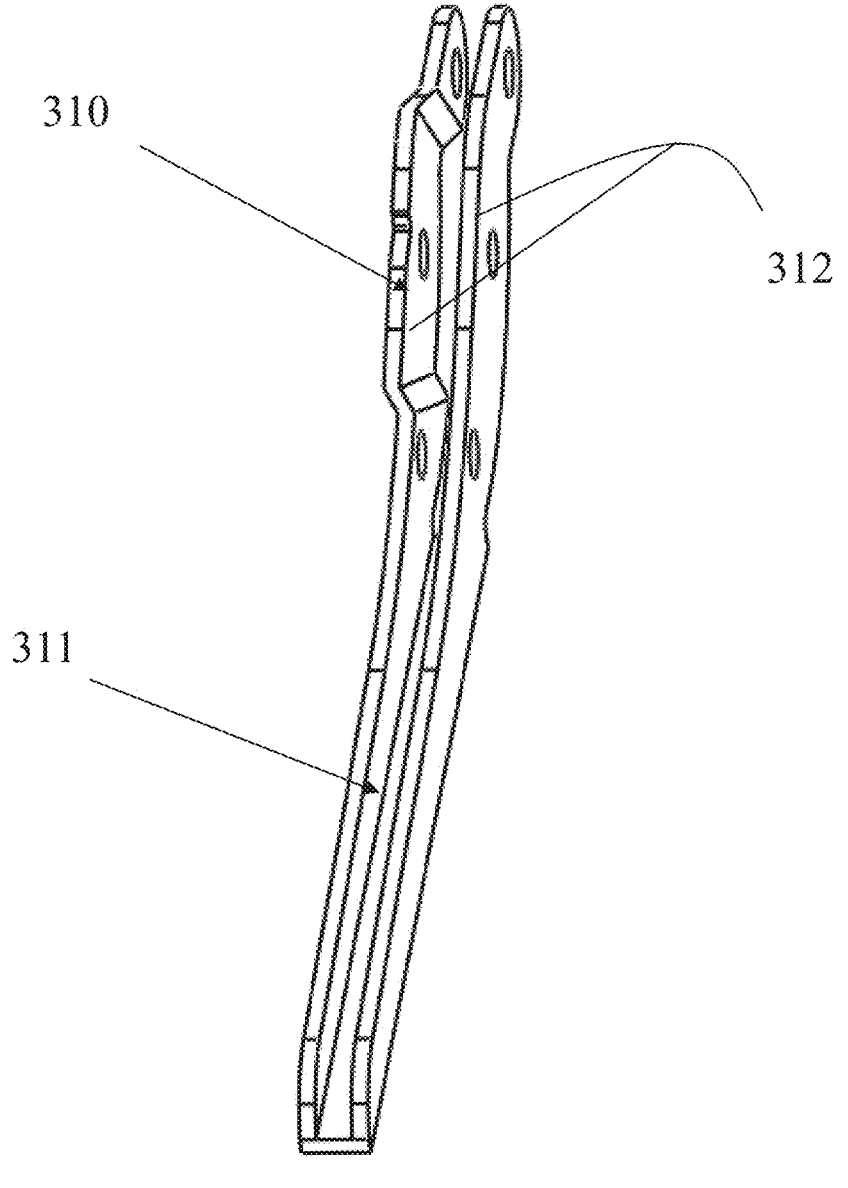
FIG. 5 is a schematic diagram of a lateral side of the left handle according to Embodiment 1 of the present disclosure.
Figure 6:
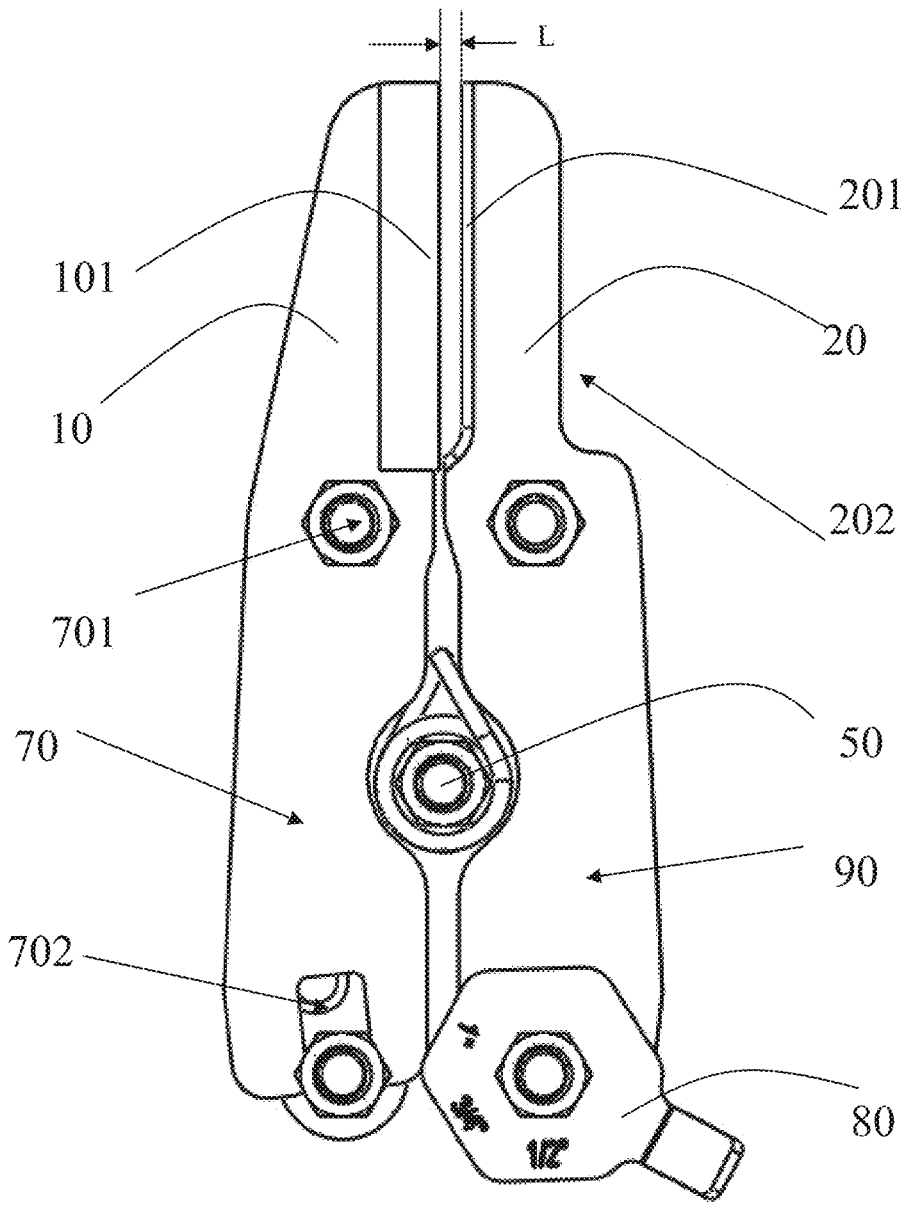
FIG. 6 is a schematic diagram of a side of the left handle according to Embodiment 1 of the present disclosure, with the left and right handles being removed.
Figure 7:
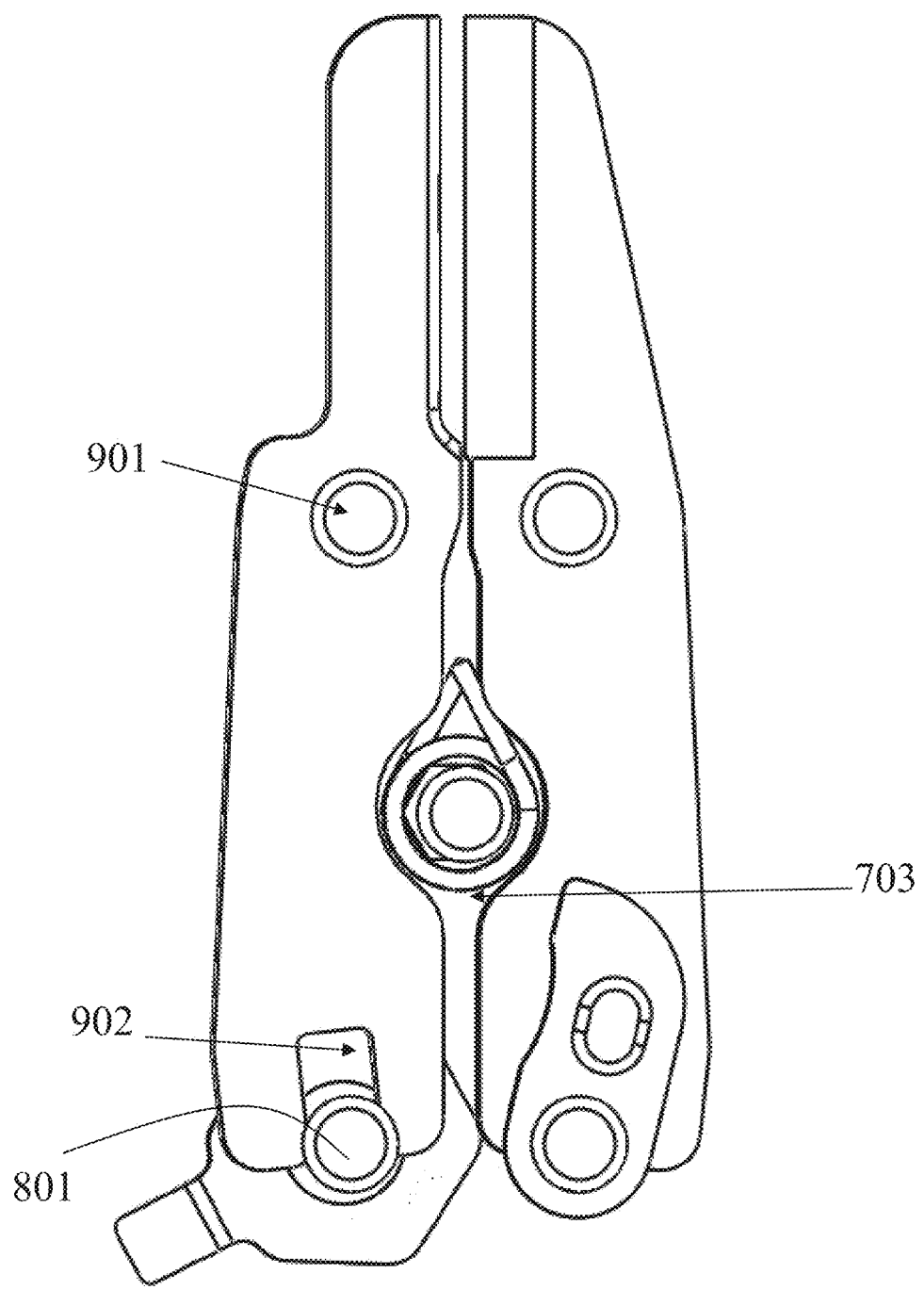
FIG. 7 is a schematic diagram of another side of the left handle according to Embodiment 1 of the present disclosure, with the left and right handles being removed.

The two left plier pieces 312 may or may not be parallel to each other. In this embodiment, one of the left plier pieces is planar, and the other one of the left plier pieces protrudes outward, so does the right cutting plier blade, as shown in FIG. 5.

In this embodiment, the hinge member includes a left hinge piece 70 and a right hinge piece 90. One end of the left hinge piece 70 is connected with the first cutting part, the other end of the left hinge piece is connected with one of two ends of the two left connecting members; one end of the right hinge piece 90 is connected with the second cutting part, the other end of the right hinge piece 90 is connected with one of two ends of the two right connecting members. The other one of two ends of the two left connecting members is connected with an end of the right hinge piece 90, and the other one of two ends of the two right connecting members is connected with an end of the left hinge piece. The left hinge piece 90 and the right hinge piece are respectively oppositely provided with arc-shaped grooves 703 for accommodating the bolts. The other end of the left hinge piece is provided with a groove 702, and the other end of the right hinge piece 90 is also provided with a groove 902. The grooves each have a square structure, and the square grooves are used for accommodating the fasteners. One end of each of the two left hinge pieces is provided with a through hole 701, and the other end of each of the two right hinge pieces 90 is provided with a through hole 901 for the fasteners to pass through. In this embodiment, both shapes and sizes of the right hinge piece 90 and the left hinge piece 70 are the same, but in other embodiments, they may not be the same.

In this embodiment, two left plier pieces and two plier pieces are alternately arranged at two ends of the pivot. Here, the expression "alternately arranged" means that on one side of the cutting plier, one of left plier pieces intersects with one of the right plier pieces, and on the other side of the cutting plier, the other of left plier pieces intersects with the other of right plier pieces, which are all in an X-shaped arrangement. Furthermore, if the left cutting plier blade is arranged outside the right cutting plier blade on one side of the cutting plier, then the right cutting plier blade is arranged outside the left cutting plier blade on the other side of the cutting plier, so as to increase firmness.

In this embodiment, the left handle 31 or the right handle 32 further includes a paddle 40. An end of the paddle is fixed to one of the left plier pieces of the right plier pieces through a fastener, and the other end of the paddle is clamped with the right connecting member or the left connecting member, and the paddle may be provided with a bump.

In this embodiment, the left handle 31 or the right handle 32 is sleeved with a handle sleeve 33, and in this embodiment the left handle 31 and the right handle 32 are symmetrical with each other in shape and configuration.

Embodiment 2

When the cutting plier provided in Embodiment 1 is used, the two ends of the pipe are high and its middle is low due to existence of the raised sealing ring of the pipe fitting, and only a middle of a pipe (a position relatively proximate to the sealing ring 301) can be cut and two ends (as position relatively away from the sealing ring 301) cannot be completely cut, thus requiring assistance from an electric soldering iron or other devices. Even some of the pipe fittings have recesses 302 next to the raised sealing ring, and the pipe is recessed downwards along with the recesses, which makes the cutting more difficult.

In order to avoid this situation, another cutting plier is provided in Embodiment 2, a basic structure of which is the same as that of Embodiment 1, and only difference of which will be explained below.

Figure 11:
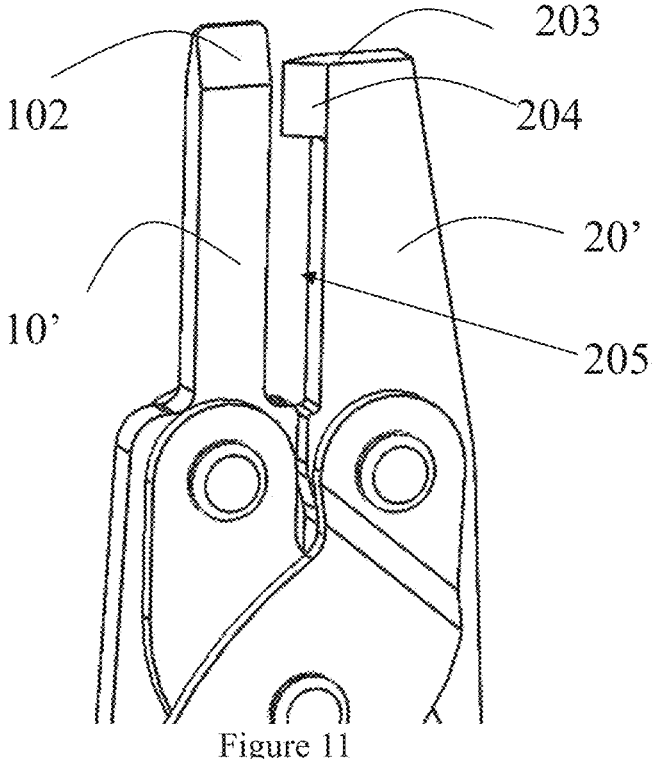
FIG. 11 is a schematic diagram of a first cutting part and a second cutting part according to Embodiment 2 of the present disclosure.
Figure 12:
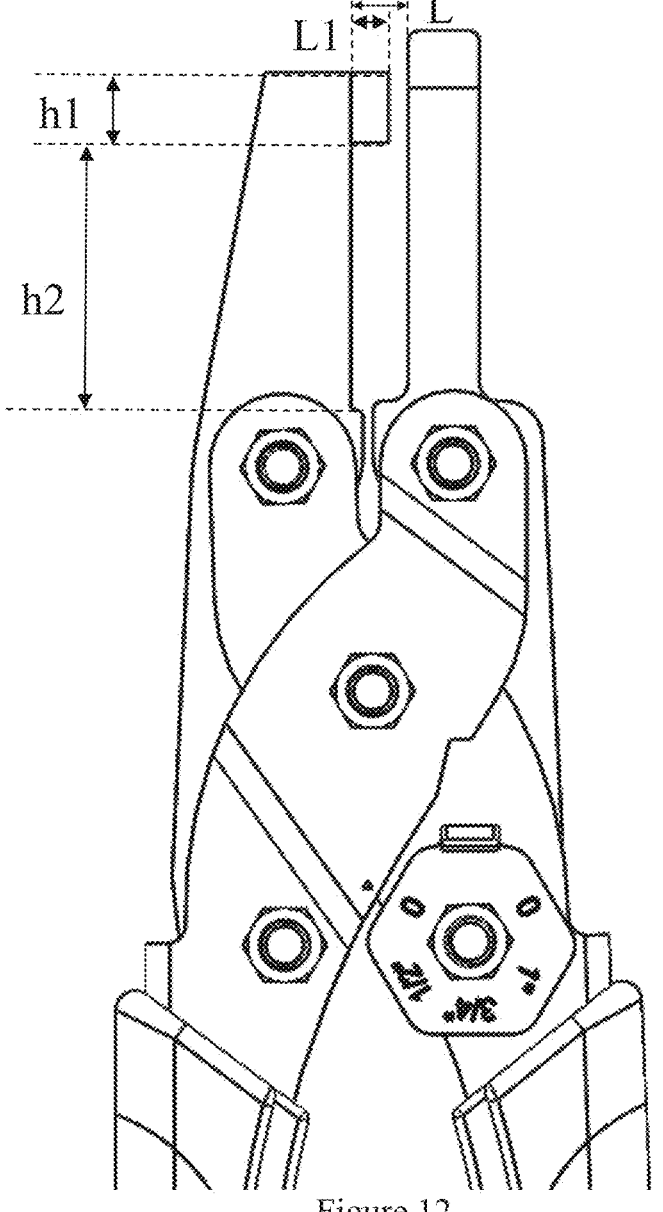
FIG. 12 is a partial schematic diagram of a cutting plier according to Embodiment 2 of the present disclosure.

As shown in FIGS. 11 and 12, a thickness of an end of the first cutting part 10' gradually decreases to form the pointed part 102. The pointed part of the first cutting part can provide a straight screwdriver prying function similar to a screwdriver, which can help pry the pipe open after or during cutting. In other embodiments, the pointed part 102 may not be provided in the first cutting part. The second cutting part 20' is provided with a partially extending blade 204, which protrudes toward the first cutting part, and a distance between the first cutting part and the second cutting part in a non-protruding part is not zero, so as to ensure that cut members such as pipes fittings are not damaged by cutting. The protruding blade of the second cutting part cooperates with a blunt part of the first cutting part to realize the cutting function, and a protruding height L1 of the blade can be so large that the blade and the blunt part of the first cutting part are completely attached, that is, a distance between them is zero. A groove 205 is provided on a side of the second cutting part proximate to the blunt part, and a distance between the first cutting part and the second cutting part at the groove is not zero. In this embodiment, the blade is arranged on a side of the groove away from the cutting plier body. A width of the blade h1 in this embodiment is much smaller than a width h2 of the groove, but in other embodiments, the width of the blade h1 is much smaller than the width h2 of the groove. In this embodiment, the width of the blade is smaller than M in FIG. 12, that is, a distance between an end of a plug of the pipe fitting for plugging in the pipe and a sealing ring, that is, the width of the blade should be small enough so that the blade can avoid the sealing ring of the pipe fitting and not damage the sealing ring. In another feasible embodiment, the width of the blade is smaller than the width of the recess 302 in FIG. 12.

In this embodiment, there is no blade at the groove 205, and the raised part are all blades. However, in some other embodiments, the groove can be provided with the blade as required, and the raised part can be only partially provided with blades.

Optionally, in addition to the three matching surfaces of Embodiment 1, a fourth matching surface can be further provided in this disclosure, and a distance between the fourth matching surface and the central axis is H4. H1, H2, H3, and H4 are all unequal, and H4 corresponds to a zero position. When it is at the zero position, a shortest gap between the first cutting part and the second cutting part is the smallest, with a best cutting function. Therefore, at this time, the blade can be embedded into both ends of the pipe being cut and the sealing ring can be avoided. When a middle part of the pipe is cut, the matching surface is adjusted to H1 or H2 or H3, so that the middle part of the pipe can be cut without damaging the sealing ring at the middle part of the pipe. However, in other embodiments, the fourth matching surface may not be provided.

Optionally, the first cutting part provided with the blade has a flat end face 203, so as to avoid other structures on the pipe fitting. The first cutting part is higher than the second cutting part, so as to further avoid other structures on the pipe fittings.

Figure 13:
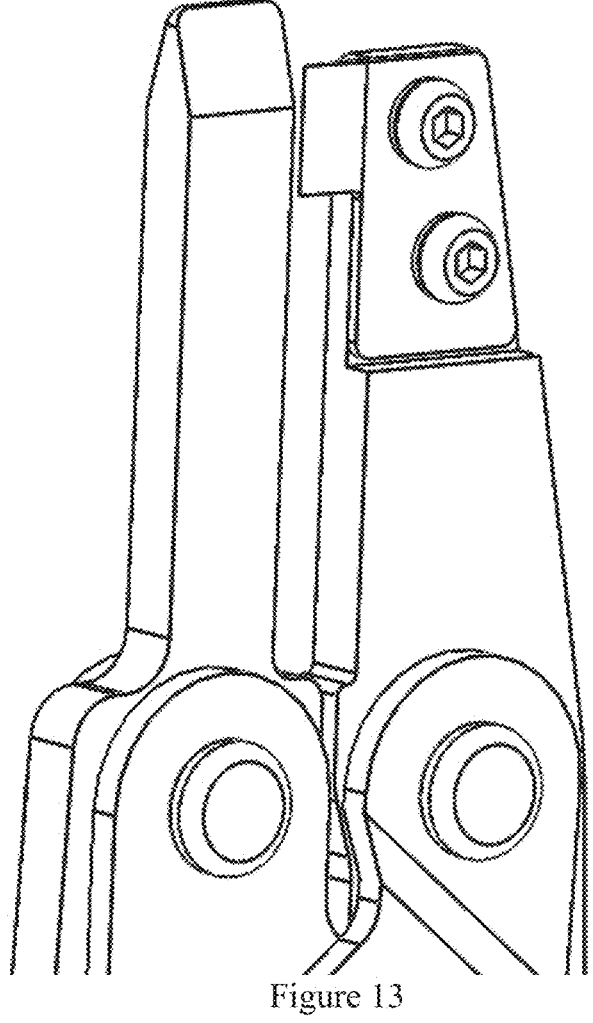
FIG. 13 is a schematic diagram of a detachable cutting plier according to Embodiment 2 of the present disclosure.

In this embodiment, the blade and the second cutting part are integrally formed. In other embodiments, as shown in FIG. 13, the blade is detachably arranged on a side of the first cutting part or the second cutting part proximate to the blunt part. In use, if the blade is damaged due to wearing or improper operation, the cutting plier can continue to be used normally by replacing the blade. The blade and the first cutting part or the second cutting part can be fixed by one or more connecting members such as threads, a specific detachable way is not limited in this disclosure, and any detachable connection is within the protection scope of the disclosure. Optionally, fixing fastness can also be increased by setting a preform.

In some other embodiments, a protruding height L1 of the blade can be adjusted, that is to say, the blade can be slidably or movably arranged relative to the first cutting part or the second cutting part so as to adjust the protruding height L1 of the blade and finally realize adjustment of the distance L.

Embodiment 3

Figure 14:
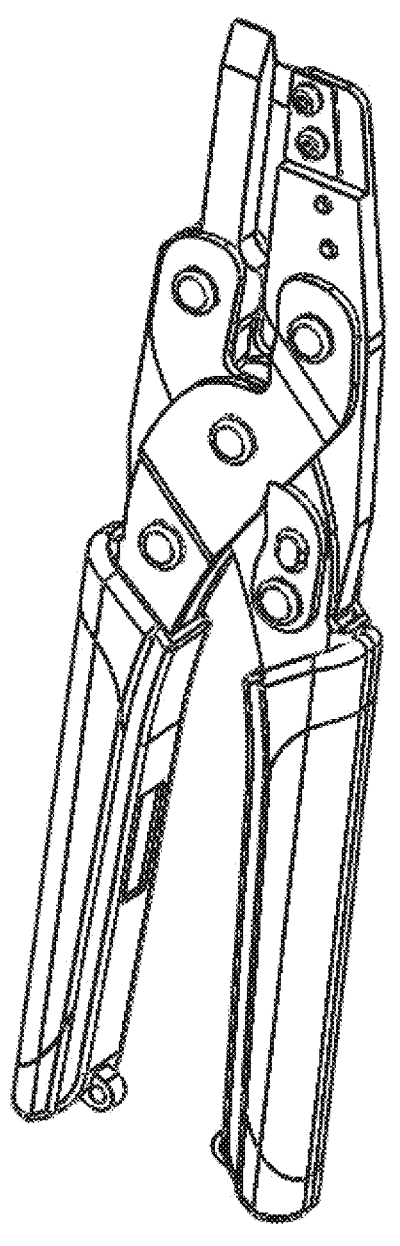
FIG. 14 is a cutting plier without an adjusting member according to another embodiment of the present disclosure.
Figure 15:
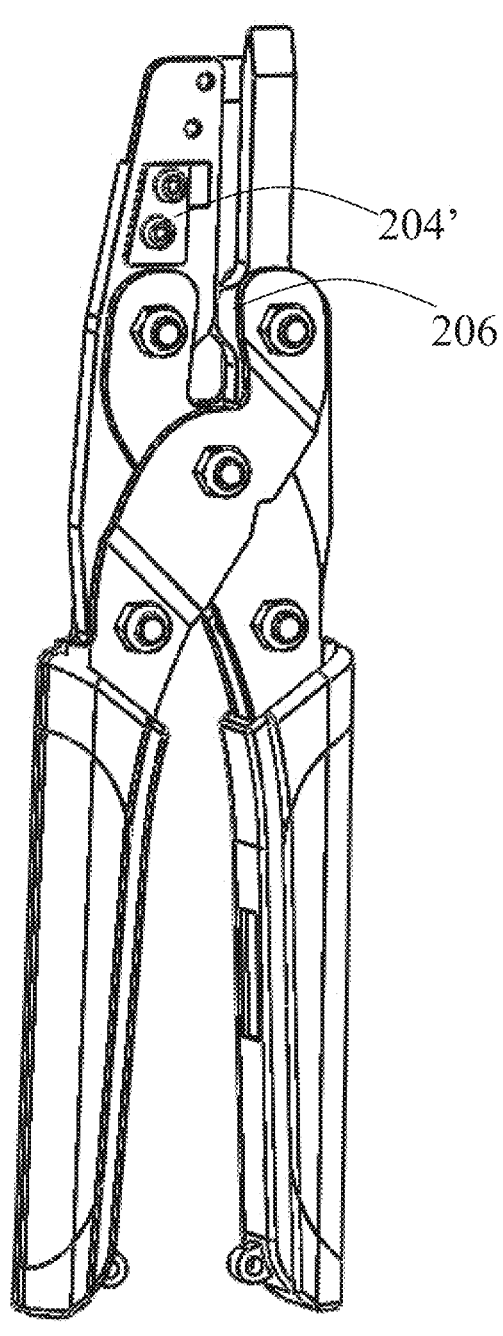
FIG. 15 is a schematic view of the cutting plier in FIG. 14 from another perspective.

Compared with the Embodiment 2, a more concise cutting plier without a rotating plate is provided in Embodiment 3, as shown in FIGS. 14 and 15, which includes a cutting plier body, a first cutting part, a second cutting part and a hinge member. The cutting plier body includes a left handle and a right handle which are hinged with each other. The second cutting part has a distance which is not zero from at least part of the first cutting part and cooperates with the first cutting part to realize the cutting function. One end of the first cutting part is connected with the right handle through a hinge member, and one end of the second cutting part is connected with the left handle through a hinge member. A distance between the first cutting part and the second cutting part can be adjusted by controlling the left and right handles. That is to say, the shortest gap can only be a fixed one, and a user can completely control a relative distance between the left handle and the right handle to control a gap between the first cutting part and the second cutting part, so as to handle cut articles with different sizes, models and shapes.

The second cutting part in Embodiment 3 and the second cutting part in Embodiment 2 have the same shape and structure, that is, they are both provided with the blade partially protruding outside, so that the cut articles can be protected from being damaged even when the shortest gap is zero. Other structures can be the same as those in Embodiment 2. However, the groove of the blunt part of Embodiment 2 is relative to the blade part, as long as a distance between the first cutting part and the second cutting part can be ensured to be non-zero, a protrusion 206 can be provided at an end or a certain part of the blunt part alternatively to provide the distance between the first cutting part and the second cutting part. Or the first cutting part and the second cutting part are provided with a protrusion at the same time to be spaced from each other.

Optionally, one or more blades 204' for replacement are detachably connected to the cutting plier in this embodiment, the blade here is attached at a position where it does not hurt hands nor affect cutting, such as the side of the first cutting part or the second cutting part.

Embodiment 4

A cutting plier head is further provided in this embodiment, which includes a first cutting part and a second cutting part which are hinged with each other. The second cutting part has a gap which is not zero from at least part of the first cutting part and the second cutting part cooperates with the first cutting part to realize the cutting function.

The first cutting part and the second cutting part can be referred to structures in the Embodiment 2.

The cutting plier head can be used with other handles with any structure.

It should be understood by those skilled in the art that in the disclosure of the present invention, the orientation or positional relationship indicated by the terms "upper", "lower", "front", "rear", "left", "right", "vertical", "horizontal", "top", "bottom", "inner", "inner" and the like is based on the orientation or positional relationship shown in the drawings, which is only for the convenience of describing the disclosure and simplifying the description, but does not indicate or imply that the referred device or element must have a specific orientation, be constructed and operated in a specific orientation, and thus the above terms cannot be understood as limiting the disclosure.

Although the disclosure has been disclosed by the preferred embodiment in the above, it is not intended to limit the disclosure and any person familiar with the art can make some changes and embellishments without departing from the spirit and scope of the disclosure; therefore, the scope of protection of the disclosure should be subject to a scope of protection as claimed in the claims.

What is claimed is:

1. A cutting plier, wherein the cutting plier comprises:
a cutting plier body comprising a left handle and a right handle which are hinged with each other
a first cutting part;
a second cutting part, the second cutting part having a gap which is not zero from at least part of the first cutting part and the second cutting part cooperating with the first cutting part to realize a cutting function; and
a hinge member through which one end of the first cutting part is connected with the right handle and through which one end of the second cutting part is connected with the left handle through a hinge member;
a gap between the first cutting part and the second cutting part is adjusted by controlling the left handle and the right handle;
wherein the first cutting part and the second cutting part are provided with a non-cutting edge and a partially extending blade opposite to each other and the non-cutting edge and the partially extending blade cooperate with each other to realize the cutting function;
the second cutting part is provided with the partially extending blade, the partially extending blade protrudes toward the first cutting part;
wherein a side of the second cutting part provided with the partially extending blade proximate to the non-cutting edge is provided with a groove, and a gap between the first cutting part and the second cutting part at a position where the groove is provided is not zero;
wherein the partially extending blade is arranged on a side of the groove away from the cutting plier body;
wherein the groove is formed by the protrusion of the partially extending blade toward the first cutting part, the partially extending blade protrudes beyond a base of an adjacent part of the groove, and the adjacent part is positioned adjacent to the partially extending blade.

2. The cutting plier according to claim 1, further comprising an adjusting member for adjusting a distance between the blade and the non-cutting edge, a width of the blade being less than 3 cm.

3. The cutting plier according to claim 2, wherein the adjusting member comprises a fixing structure to be fixed on the left handle, and the adjusting member comprises one or more matching structures, any of the one or more matching structures can be pressed against the right handle by adjusting of the adjusting member, and different matching structures have different distances from the fixing structures; or, the adjusting member comprises a fixing structure to be fixed on the right handle, and the adjusting member comprises one or more matching structures, any of the one or more matching structures is pressed against the left handle by adjusting of the adjusting member, and different matching structures have different distances from the fixing structures.

4. The cutting plier according to claim 3, wherein the fixing structure is a fixing shaft, and the matching structure comprises a rotating plate with a plurality of matching surfaces, the fixing shaft is inserted through the rotating plate and the rotating plate is rotatably disposed on the fixing shaft, and any two or more matching surfaces are at different distances from a central axis of the fixing shaft, the rotating plate is adjusted to make any of the matching surfaces abut against one of the right handle and the left handle.

5. The cutting plier according to claim 1, wherein an end away from the cutting plier body of the second cutting part provided with the blade has a flat end face.

6. The cutting plier according to claim 1, wherein a thickness of an end of the first cutting part provided with the non-cutting edge is gradually reduced, forming a pointed part with a prying function.

7. The cutting plier according to claim 1, wherein the blade is detachably arranged on a side of the first cutting part or the second cutting part proximate to the non-cutting edge.

8. The cutting plier according to claim 1, wherein another end of the first cutting part or the second cutting part relative to the non-cutting edge or the blade is provided with a depression.

9. The cutting plier according to claim 1, wherein the left handle comprises a left handle body and a left connecting member, one end of the left handle body being provided with a left connecting member; and the right handle comprises a right handle body and a right connecting member, one end of the right handle being provided with a right connecting member, the left connecting member and the right connecting member being connected by a pivot on which a spring is sleeved.

10. The cutting plier according to claim 9, wherein the left connecting member comprises two left plier pieces arranged oppositely, two ends of which are respectively connected by fasteners; and the right connecting member includes two right plier pieces arranged oppositely, two ends of which are respectively connected by fasteners, and middle ends of the two left plier pieces are connected with middle ends of the two right plier pieces by the pivot.

11. The cutting plier according to claim 10, wherein the binge member comprises a left hinge piece and a right hinge piece, one end of the left hinge piece being connected with the first cutting part, the other end of the left hinge piece being connected with one of two ends of the two left connecting members; one end of the right hinge piece being connected with the second cutting part, the other end of the right hinge piece being connected with one of two ends of the two right connecting members; the other one of two ends of the two left connecting members is connected with an end of the right hinge piece, and the other one of two ends of the two right connecting members is connected with an end of the left hinge piece.

12. The cutting plier according to claim 11, wherein the two left plier pieces and the two right plier pieces are alternately arranged at two ends of the pivot.

13. The cutting plier according to claim 11, wherein the left handle or the right handle further comprises a paddle, an end of the paddle is fixed to one of the left plier pieces or the right plier pieces through a fastener, and the other end of the paddle is clamped with the right connecting member or the left connecting member.

14. The cutting plier according to claim 1, wherein the first cutting part is longer than the second cutting part.

15. A cutting plier head, comprising a first cutting part and a second cutting part which are hinged with each other, the second cutting part having a gap which is not zero from at least part of the first cutting part and the second cutting part cooperating with the first cutting part to realize a cutting function;
wherein the first cutting part and the second cutting part are provided with a non-cutting edge and a partially extending blade opposite to each other, the non-cutting edge is different from the partially extending blade to prevent damage during cutting, and the non-cutting edge and the partially extending blade cooperate with each other to realize the cutting function;

the second cutting part is provided with the partially extending blade, the partially extending blade protrudes toward the first cutting part;

wherein a side of the second cutting part provided with the partially extending blade proximate to the non-cutting edge is provided with a groove, and a gap between the first cutting part and the second cutting part at a position where the groove is provided is not zero;

wherein the partially extending blade is arranged on a side of the groove away from the cutting plier body;

wherein the groove is formed by the protrusion of the partially extending blade toward the first cutting part, the partially extending blade protrudes beyond a base of an adjacent part of the groove, and the adjacent part is positioned adjacent to the partially extending blade.

16. A cutting plier, comprising:

a cutting plier body comprising a left handle and a right handle which are hinged with each other a first cutting part;

a second cutting part, the second cutting part having a gap which is not zero from at least part of the first cutting part and the second cutting part cooperating with the first cutting part to realize a cutting function; and a hinge member through which one end of the first cutting part is connected with the right handle and through which one end of the second cutting part is connected with the left handle through a hinge member;

a gap between the first cutting part and the second cutting part is adjusted by controlling the left handle and the right handle;

wherein the left handle comprises a left handle body and a left connecting member, one end of the left handle body being provided with a left connecting member; and the right handle comprises a right handle body and a right connecting member, one end of the right handle being provided with a right connecting member, the left connecting member and the right connecting member being connected by a pivot on which a spring is sleeved;

wherein the left connecting member comprises two oppositely arranged left plier pieces, two ends of which are respectively connected by fasteners; and the right connecting member includes two oppositely arranged right plier pieces, two ends of which are respectively connected by fasteners, and middle ends of the two left plier pieces are connected with middle ends of the two right plier pieces by the pivot;

wherein the hinge member comprises a left hinge piece and a right hinge piece, one end of the left hinge piece being connected with the first cutting part, the other end of the left hinge piece being connected with one of two ends of the two left connecting members; one end of the right hinge piece being connected with the second cutting part, the other end of the right hinge piece being connected with one of two ends of the two right connecting members; the other one of two ends of the two left connecting members is connected with an end of the right hinge piece, and the other one of two ends of the two right connecting members is connected with an end of the left hinge piece.

* * * * *